(12) United States Patent
Shakkarwar

(10) Patent No.: US 9,373,141 B1
(45) Date of Patent: *Jun. 21, 2016

(54) SYSTEM AND METHOD FOR AUTOMATICALLY FILLING WEBPAGE FIELDS

(75) Inventor: Rajesh G. Shakkarwar, Cupertino, CA (US)

(73) Assignee: VERIENT, INC., San Jose, CA (US)

( * ) Notice: Subject to any disclaimer, the term of this patent is extended or adjusted under 35 U.S.C. 154(b) by 496 days.

This patent is subject to a terminal disclaimer.

(21) Appl. No.: 12/888,328

(22) Filed: Sep. 22, 2010

Related U.S. Application Data

(60) Provisional application No. 61/245,218, filed on Sep. 23, 2009.

(51) Int. Cl.
*G06Q 40/00* (2012.01)
*G07F 17/32* (2006.01)

(52) U.S. Cl.
CPC ............... *G06Q 40/00* (2013.01); *G07F 17/32* (2013.01)

(58) Field of Classification Search
CPC .......... G06Q 40/00–40/08; G07F 17/32–17/42
USPC .................................................... 705/35–45
See application file for complete search history.

(56) References Cited

U.S. PATENT DOCUMENTS

| | | | |
|---|---|---|---|
| 5,953,710 A | 9/1999 | Fleming | |
| 6,101,486 A * | 8/2000 | Roberts et al. | 705/14.66 |
| 6,311,194 B1 * | 10/2001 | Sheth et al. | 715/236 |
| 6,901,387 B2 * | 5/2005 | Wells et al. | 705/64 |
| 6,973,627 B1 * | 12/2005 | Appling | 715/781 |
| 6,993,712 B2 * | 1/2006 | Ramachandran et al. | 715/234 |
| 7,225,156 B2 * | 5/2007 | Fisher et al. | 705/50 |
| 7,548,890 B2 * | 6/2009 | Shakkarwar | 705/75 |
| 7,567,934 B2 | 7/2009 | Flitcroft et al. | |
| 7,571,142 B1 | 8/2009 | Flitcroft et al. | |
| 7,593,896 B1 | 9/2009 | Flitcroft et al. | |
| 7,640,512 B1 * | 12/2009 | Appling | 715/771 |
| 7,865,414 B2 * | 1/2011 | Fung et al. | 705/35 |
| 7,881,999 B2 * | 2/2011 | Bagheri | 705/35 |
| 7,882,203 B2 * | 2/2011 | Sasnett et al. | 709/219 |
| 7,912,917 B2 * | 3/2011 | Chakra et al. | 709/217 |
| 7,953,671 B2 * | 5/2011 | Bishop et al. | 705/67 |
| 7,983,987 B2 * | 7/2011 | Kranzley et al. | 705/44 |
| 8,019,664 B1 * | 9/2011 | Tifford et al. | 705/31 |

(Continued)

FOREIGN PATENT DOCUMENTS

| | | |
|---|---|---|
| EP | 1 383 073 | 1/2004 |
| WO | WO 2005/017793 | 2/2005 |
| WO | WO 2007/011791 | 1/2007 |

OTHER PUBLICATIONS

PCT Search Report, PCT/US09/43161, mailed Nov. 9, 2009.

(Continued)

*Primary Examiner* — Narayanswamy Subramanian
(74) *Attorney, Agent, or Firm* — Artegis Law Group, LLP

(57) ABSTRACT

A computer-implemented method for automatically populating fields of an online webpage. The method includes inserting a code segment into a first webpage that is configured to populate fields included in the first webpage with received data, where the first webpage is displayed on a display device in a web browser application executing on a computer system; receiving data from a second webpage; and executing the code segment to populate the fields based on the received data.

26 Claims, 11 Drawing Sheets

(56) References Cited

U.S. PATENT DOCUMENTS

| | | | |
|---|---|---|---|
| 8,024,267 B2* | 9/2011 | Olliphant et al. | 705/39 |
| 8,028,041 B2* | 9/2011 | Olliphant et al. | 709/225 |
| 8,065,610 B2* | 11/2011 | Xu et al. | 715/240 |
| 8,073,895 B2* | 12/2011 | Hamzeh et al. | 709/200 |
| 8,612,343 B2* | 12/2013 | Bezos et al. | 705/39 |
| 8,910,256 B2* | 12/2014 | Sharif | G06F 21/31 713/185 |
| 2002/0055907 A1* | 5/2002 | Pater et al. | 705/39 |
| 2002/0077978 A1* | 6/2002 | O'Leary et al. | 705/40 |
| 2002/0087427 A1* | 7/2002 | Ganesan et al. | 705/26 |
| 2002/0087469 A1* | 7/2002 | Ganesan et al. | 705/40 |
| 2002/0095386 A1 | 7/2002 | Maritzen et al. | |
| 2002/0198806 A1 | 12/2002 | Blagg et al. | |
| 2003/0074403 A1* | 4/2003 | Harrow | G06F 17/30206 709/203 |
| 2004/0039694 A1 | 2/2004 | Dunn et al. | |
| 2004/0205593 A1* | 10/2004 | Kraemer | 715/513 |
| 2004/0230495 A1 | 11/2004 | Lotvin et al. | |
| 2005/0004909 A1* | 1/2005 | Stevenson et al. | 707/5 |
| 2005/0021399 A1 | 1/2005 | Postrel | |
| 2005/0132202 A1 | 6/2005 | Dillaway et al. | |
| 2005/0240522 A1* | 10/2005 | Kranzley et al. | 705/40 |
| 2005/0289057 A1 | 12/2005 | Onizuka | |
| 2006/0064320 A1 | 3/2006 | Postrel | |
| 2006/0076400 A1 | 4/2006 | Fletcher | |
| 2006/0168096 A1* | 7/2006 | Hayward et al. | 709/217 |
| 2007/0017976 A1 | 1/2007 | Peyret et al. | |
| 2007/0083464 A1 | 4/2007 | Cordero Torres et al. | |
| 2007/0192245 A1* | 8/2007 | Fisher et al. | 705/39 |
| 2008/0082924 A1* | 4/2008 | Pally | 715/744 |
| 2008/0086424 A1 | 4/2008 | Jambunathan et al. | |
| 2008/0120195 A1* | 5/2008 | Shakkarwar | 705/26 |
| 2008/0249931 A1* | 10/2008 | Gilder et al. | 705/39 |
| 2009/0070260 A1 | 3/2009 | Flitcroft et al. | |
| 2009/0076966 A1* | 3/2009 | Bishop et al. | 705/67 |
| 2009/0131025 A1* | 5/2009 | Sharma et al. | 455/414.3 |
| 2009/0183062 A1* | 7/2009 | Pally | 715/217 |
| 2009/0228370 A1 | 9/2009 | Shakkarwar | |
| 2009/0234751 A1* | 9/2009 | Chan | G06Q 20/145 705/26.1 |
| 2010/0037303 A1* | 2/2010 | Sharif | G06F 21/31 726/6 |
| 2010/0241518 A1* | 9/2010 | McCann | 705/17 |
| 2010/0251143 A1* | 9/2010 | Thomas et al. | 715/760 |
| 2011/0202424 A1* | 8/2011 | Chun et al. | 705/26.8 |
| 2011/0246374 A1* | 10/2011 | Franz | 705/77 |

OTHER PUBLICATIONS

PCT Search Report, PCT/US09/432001, mailed Jun. 16, 2009.
EP Search Report for Application No. 09743702.4—1238 / 2300972 PCT/US2009043200 dated Apr. 20, 2012.
Final Office Action, U.S. Appl. No. 12/118,643, dated Sep. 23, 2010.
PCT Search Report, PCT Appl. No. PCT/US2010/049985, mailed Nov. 17, 2010.

* cited by examiner

FIG. 3 merchant.com https://secure.merchant.com/checkout/shippingbilling.asp?straction=

Q▼ Merchant

325

WORLD WIDE WEB

| Item | Qty | Total |
|---|---|---|
| Classic Dress Shirt<br>Unit Price: $89.50<br>Color: Light Blue<br>SIZE: 16-33<br>STYLE: 124649<br>Usually arrives in 5-8 business days.<br>⊞ Add a Gift Box or Note | 1 | $89.50 |

Summary

Payment Information

Pay with a Gift Card

Only one gift card may be used per order. For details on using your gift card click here.

Gift Card Number: [      ]

Access Number: [   ] A 3-digit number on the back, upper-right corner of your card.

Update my order with Gift Card

[ Update ]

Payment Method

Payment type — 330
[ Pay from my fin. inst. ▼ ]

Name On Card
[                    ]

Select a Financial Institution — 335  Exp. Date
[                    ▼ ]              [    ]

Payment Card Number                    PIN
[                    ]                 [    ]

☐ Set as Default Payment Card

SYSTEM AND METHOD FOR AUTOMATICALLY FILLING WEBPAGE FIELDS

CROSS-REFERENCE TO RELATED APPLICATIONS

This application claims benefit of U.S. provisional patent application Ser. No. 61/245,218, filed on Sep. 23, 2009.

BACKGROUND

1. Field of the Invention

Embodiments of the present invention generally relate to a system for performing an online payment transaction and, more specifically, to a system and method for automatically filling webpage fields.

2. Description of the Related Art

As is known, several methods of payment for goods or services exist today, including cash, check, credit card, and debit card. Some of the most popular methods of payment include payment by credit card and by debit card. When credit/debit cards were first introduced, there was no concept of online payments, online banking, or payments via mobile phone. Today, these forms of payment are also very common.

As is known, a credit card system is one where an issuer, usually a financial institution, issues a credit card to a customer. The customer may then pay for goods or services using the credit card. Essentially, the issuer is lending money to the customer to pay for the good or services.

Another common form of payment is using a debit card. Using a debit card is functionally similar to writing a check, as the funds are withdrawn from the bank account of the customer. A transaction using a debit card may be a "signature debit" transaction or a "PIN debit" transaction. When using either form of debit transaction at a physical merchant location, the customer may swipe or insert the debit card into a terminal, or the customer may hand the debit card to the cashier who will do so. A signature debit transaction is authenticated much like a credit card transaction with the customer signing a receipt to verify their identity. A PIN debit transaction, on the other hand, is authenticated when the customer enters a correct personal identification number (PIN) into the terminal.

A signature debit transaction may also be initiated on the Internet. For example, the buyer may type a debit card number into the appropriate payment fields on an online merchant payment webpage to pay for the goods or services provided by the online merchant. To the online merchant, a signature debit transaction is processed similarly to a credit card transaction.

However, one problem with paying for goods or services online is that the user must manually type all of the information for the payment product into the online payment page, including the card number, PIN, expiration date, and/or card verification value ("CVV"), among others. Entering all of this information for each online payment transaction is tedious and error-prone.

As the foregoing illustrates, there is a need in the art for a technique that overcomes the limitations of prior art approaches to online payment.

SUMMARY

One embodiment of the invention provides a computer-implemented method for automatically populating fields of an online webpage. The method includes inserting a code segment into a first webpage that is configured to populate fields included in the first webpage with received data, where the first webpage is displayed on a display device in a web browser application executing on a computer system; receiving data from a second webpage; and executing the code segment to populate the fields based on the received data.

Another embodiment of the invention provides a computer-implemented method for automatically populating fields of a webpage. The method includes transmitting data from a browser add-on installed in a second webpage to a code segment inserted in a first webpage, where the code segment is configured to populate one or more fields included in the first webpage with received data, where the browser add-on is not installed in the first webpage, and where the first webpage is displayed on a display device in a web browser application executing on a computer system; and executing the code segment to populate the fields included in the first webpage with the received data.

Advantageously, embodiments of the invention allow users to save time when entering data into fields of an online webpage.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3 is a screen shot illustrating a payment page of the online merchant, according to one embodiment of the invention.

FIG. 4 is a screen shot illustrating a secure pay window generated by a financial institution that prompts the user to enter a username and a password, according to one embodiment of the invention.

FIG. 6 is a screen shot illustrating an account list generated by the payment processing platform displayed via a secure payment page, according to one embodiment of the invention.

FIG. 7 is a screen shot illustrating a child product generated by the payment processing platform, according to one embodiment of the invention.

DETAILED DESCRIPTION

In general, embodiments of the invention relate to performing a payment transaction using a child product that is linked to a core account. More specifically, embodiments of the invention are described in relation to a system for facilitating an online payment transaction with an online merchant using the child product. As is understood by those having ordinary skill in the art, embodiments the invention may be employed with any system that is configured to facilitate any type of online transaction without departing from the principles of the present invention.

As is described in greater detail below, a user may generate a "child product" that is linked to a "core account" held with a financial institution. In one embodiment, the core account may be any standard account held with a financial institution, including a checking account, a savings account, a home equity line of credit, a money market account, a healthcare savings account, an educational savings account, a rewards or loyalty program account, or the like. In other embodiments, the core account may be associated with any type of billed account, including a utility bill account, cable account, satellite television account, phone service account, cell phone account, or the like. In one embodiment, the child product is generated by a payment processing platform and may be used to make payment transactions. The payment transactions are processed as though the payment transactions were made using the core account. A payment transaction initiated with an online merchant using the child product is referred to herein as "child transaction." To the online merchant, the child transaction may be processed as though the payment processing platform is the "issuer" of the child product. The payment processing platform determines the core account to which the child product is linked and generates a core account transaction that is processes by a financial institution. To the financial institution, the core account transaction may be processed as though the payment processing platform is the "merchant" from which the transaction was initiated. For example, a child product that is linked to a checking core account is processed by the financial institution legacy system in the similar manner as a regular checking account transaction. In further embodiments, control parameters may be added to the child product, restricting the usage of the child product, as described in greater detail below.

System Overview

Figure 1:
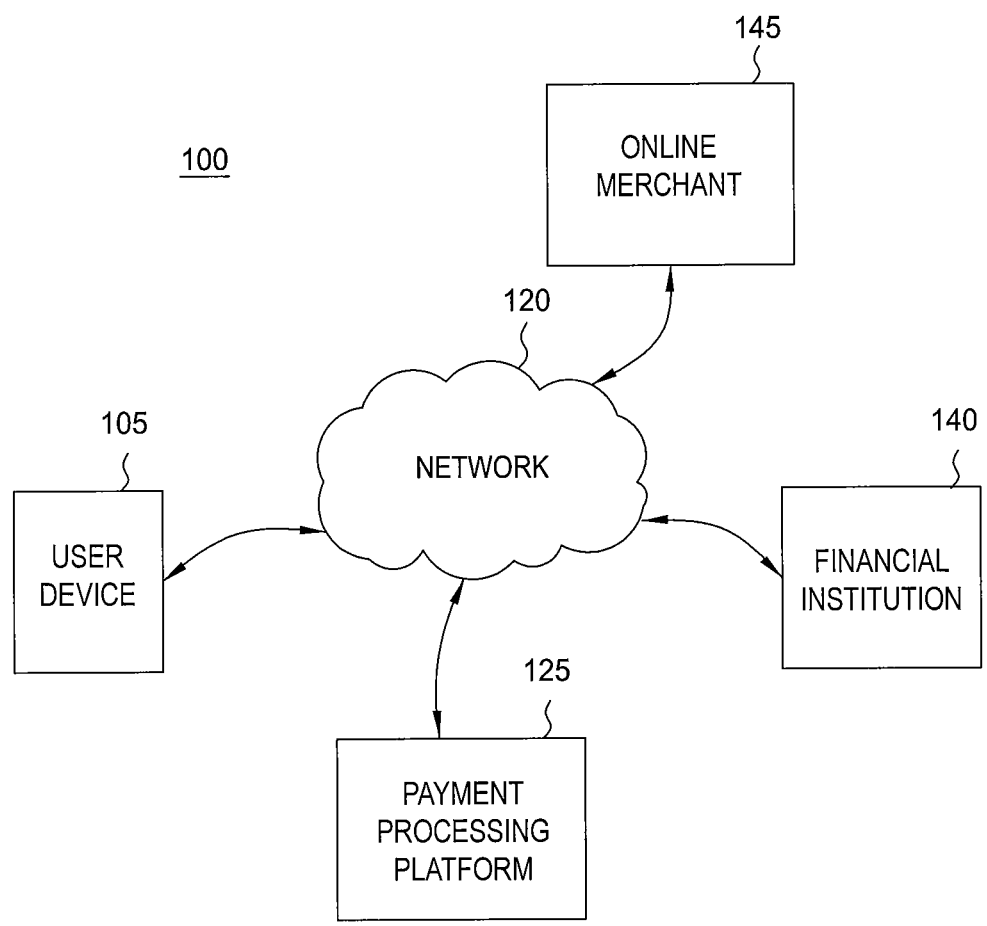
FIG. 1 is a block diagram illustrating components of a system configured to implement one or more aspects of the present invention.

FIG. 1 is a block diagram illustrating components of a system 100 configured to implement one or more aspects of the present invention. As shown, the system 100 includes a user device 105, a network 120, a payment processing platform 125, a financial institution 140, and an online merchant 145. As will be described herein, a child product is generated that allows for a child transaction to be performed via a payment webpage provided by the online merchant 145. Similar to a conventional online credit card transaction using a standard credit card, the user is able to pay for goods or services rendered by the online merchant 145. One unique difference is that a virtual card number and a virtual CVV are generated that are linked to the core account, and user is able to proceed with the payment transaction as if the transaction was being made using a conventional credit card or debit card.

The user device 105 may be any type of individual computing device such as, for example, a desktop computer, a laptop computer, a hand-held mobile device, a personal digital assistant, or the like. The user device 105 may include a display device, a processor, and a memory that stores instructions executed by the processor. Various software applications may be executing on the user device, including a web browser application. The web browser application allows a user to navigate the Internet and display the webpages visited on the display device. In one embodiment, the user device 105 is configured to be in communication with the other components in the system 100 via the network 120. The network 120 may be any type of data network, such as a local area network (LAN), a wide area network (WAN), cellular communications network, the Internet, a voice network such as a standard telephone network, or may be a combination of these types of networks.

The system 100 also includes the payment processing platform 125. The payment processing platform 125 interacts with the other components in the system 100 via the network 120 at various steps during the payment transaction, as will be described herein. For example, at one step, the payment processing platform 125 may be configured to store a list of financial institutions from which funds are withdrawn during the payment transaction. At another step, for example, the payment processing platform 125 may be configured to generate or retrieve the child product that is used to pay the online merchant 145.

The system 100 also includes the financial institution 140 that may be used to authenticate the user during the payment transaction and to provide data regarding the user's various accounts. The system 100 further includes the online merchant 145 which sells goods or services to the user. In one embodiment, the online merchant 145 includes a server that hosts a merchant webpage to which the user can navigate using a web browser application that is executed by a processor included in the user device 105.

Figure 2:
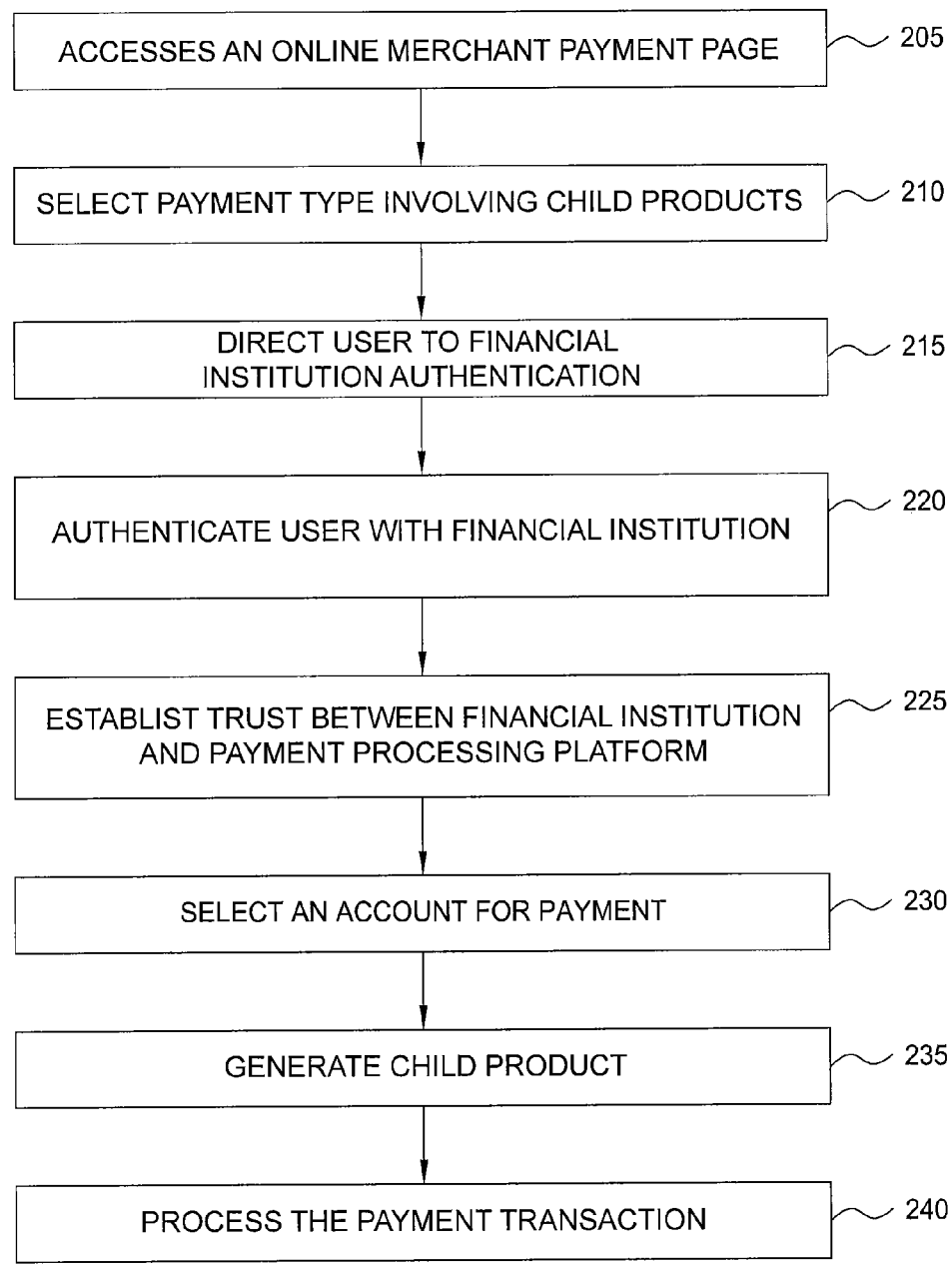
FIG. 2 is a flow diagram of method steps for initiating a child product payment transaction, according to one embodiment of the invention.

FIG. 2 is a flow diagram of method steps for initiating a child product payment transaction, according to one embodiment of the invention. Persons skilled in the art will understand that, even though the method is described in conjunction with the systems of FIG. 1, any system configured to perform the steps of the method 200 illustrated in FIG. 2, in any order, is within the scope of the present invention.

As shown, the method 200 begins at step 205 where a user accesses an online merchant payment page with the user device 105 to input payment information to pay for goods or services. At step 210, the user selects a payment type involving a child product. In one embodiment, the payment type may be a "Pay From My Financial Institution" payment type or a "Pay Using SecurePay" payment type. In one embodiment, the online merchant payment page may display a list of financial institutions from which the user can choose to generate the child product. For example, a trigger is sent to the payment processing platform 125, which in return sends the list of all financial institutions offering payment via a child product payment transaction. In another example, the online merchant stores the list of financial institutions in its system.

Referring now to FIG. 3, a screen shot illustrates a payment page 325 of the online merchant 145, according to one embodiment of the invention. The user may select a payment type from a drop-down menu 330. In one embodiment, the user selects a "Pay From My Financial Institution" payment type, which corresponds to a payment type involving a child product. The user may then be prompted to select a specific financial institution in a financial institution selection field 335. For example, a list of financial institutions may be displayed in a drop-down menu or the selection of a financial institution may be made by typing the name of the financial institution into the financial institution selection field 335.

In one embodiment, the listing of financial institutions available for selection is provided by the payment processing platform 125. As described above, the payment processing platform 125 may receive a trigger that indicates that the user has selected to pay using a child product. The payment processing platform 125 may respond by sending a list of financial institutions to the online merchant payment page via the network 120. In this embodiment, the payment processing platform 125 stores and maintains the list of financial institutions along with the necessary information relating to each financial institution. Storing the listing of financial institutions at the payment processing platform 125 allows the listing to be updated by the payment processing platform 125 as additional financial institutions are added, without having to modify the payment page of the online merchant. For example, the payment processing platform 125 may send the online merchant 145 an updated list of financial institutions each time that a user selects the "Pay From My Financial Institution" payment type.

Referring back to FIG. 2, at step 215, the payment processing platform 125 directs the user to authenticate with the financial institution. Additionally, in one embodiment, the payment processing platform 125 captures information relating to the online merchant 145 so that a merchant-specific child product may be generated by using merchant-specific control parameters, as described in greater detail below.

At step 220, the user is authenticated with the financial institution 140. In one embodiment, the user may be authenticated by entering a username and password into a log-on screen of the financial institution website.

In alternative embodiments, a third-party, other than a financial institution, may offer the ability to generate child products. In these embodiments, the user may be authenticated, at steps 215 and 220, by entering a username and password into a log-on screen of the third-party website. In yet further embodiments, the user device 105 with which the user is attempting to authenticate himself is verified by comparing a device fingerprint for the user device against a database of user devices previously registered by the user.

Figure 4:
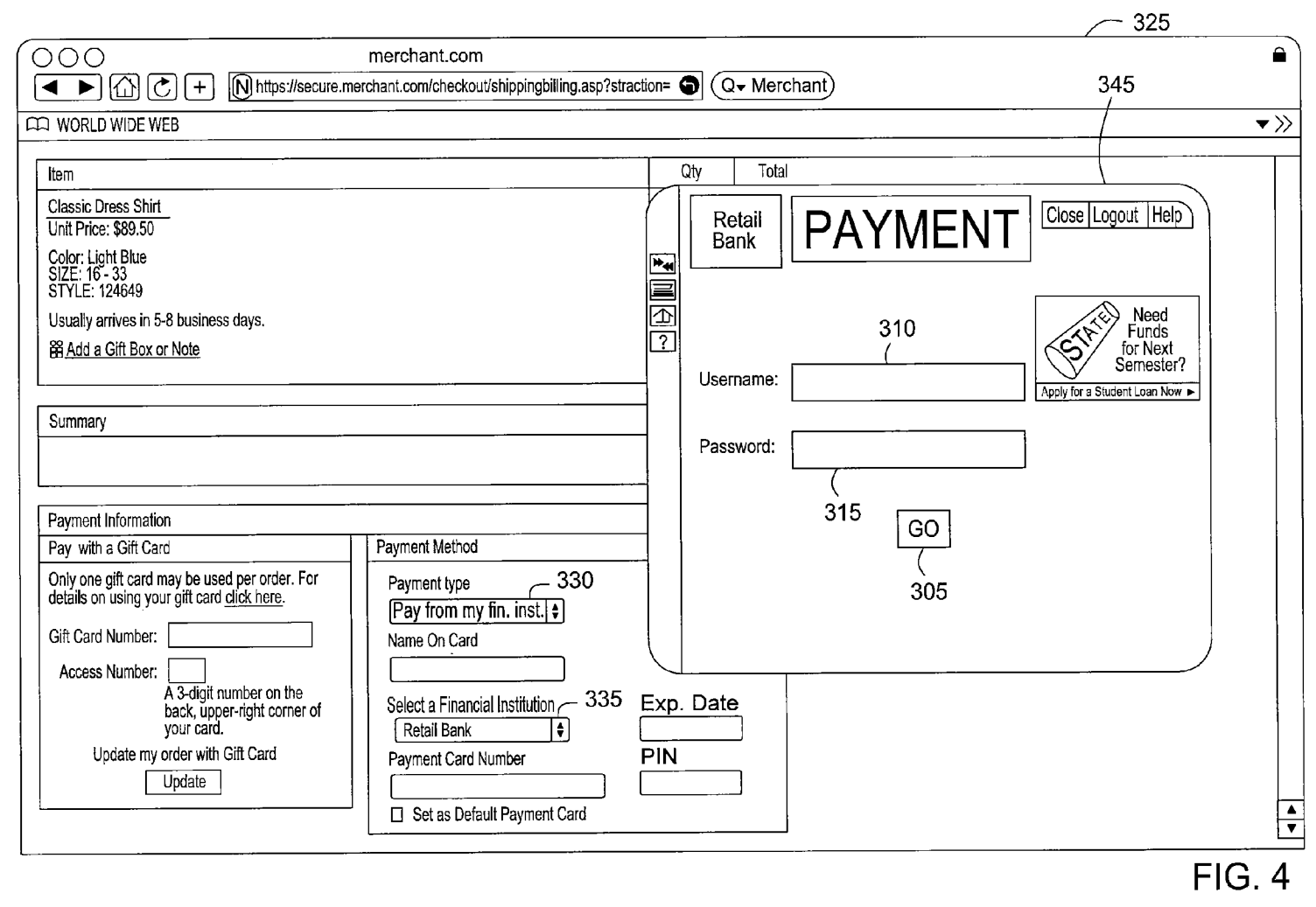

Referring now to FIG. 4, the financial institution 140 generates a secure payment page 345 that prompts the user to enter a username 310 and a password 315. After the information is entered, the user selects a button 305 to continue the payment process. The financial institution 140 then uses the username and password to authenticate the user. As is known, the authenticating system verifies the username and password with previously stored personal information about the user and subsequently authenticates the user when the identity information matches.

In another embodiment, a third party other than a financial institution is responsible for authentication and generates the secure payment page 345. Once the user is properly authenticated, the method 200 proceeds to step 225.

At step 225, a trust is established between the financial institution 140 and the payment processing platform 125. In another embodiment, at step 225, a trust is established between a third party other than a financial institution that may be responsible for authentication and the payment processing platform 125. Step 225 is described in greater detail in FIG. 5.

Figure 5:
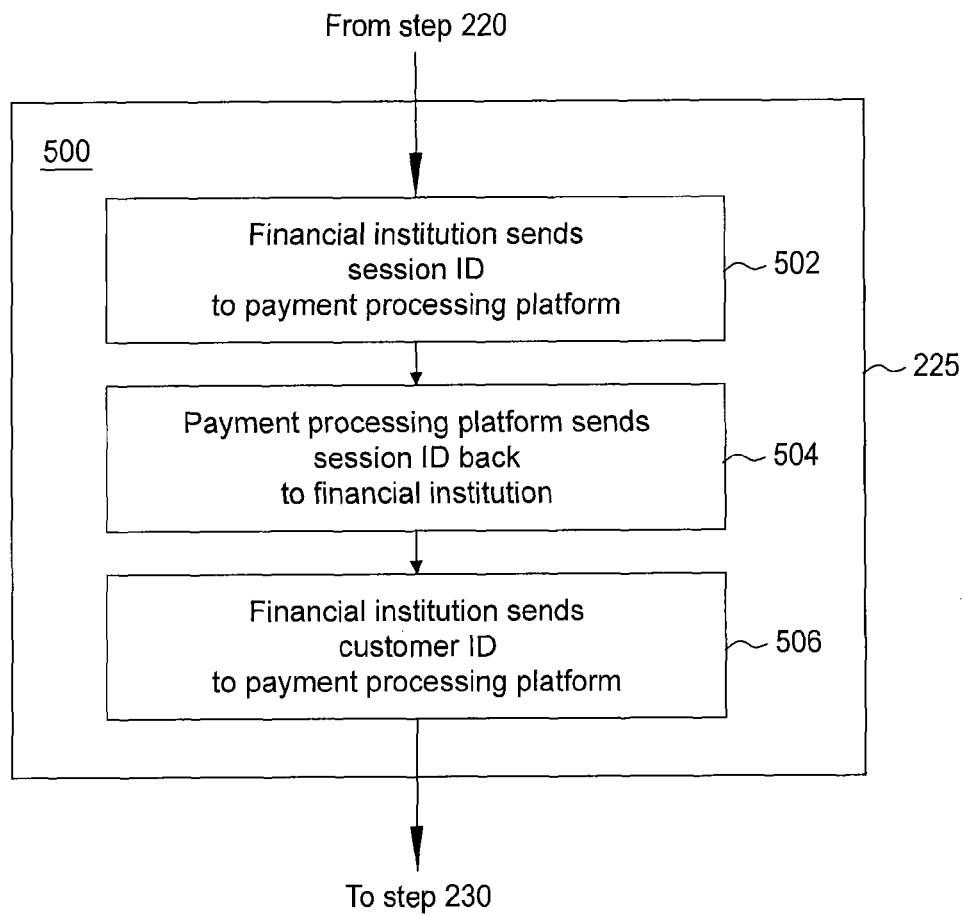
FIG. 5 is flow diagram of method steps for establishing trust between a financial institution and a payment processing platform, according to embodiments of the invention.

FIG. 5 is flow diagram of method steps for establishing trust between a financial institution 140 and a payment processing platform 125, according to embodiments of the invention. Persons skilled in the art will understand that, even though the method is described in conjunction with the systems of FIG. 1, any system configured to perform the steps of the method 500 illustrated in FIG. 5, in any order, is within the scope of the present invention.

As shown, the method 500 begins at step 502 where the financial institution 140 sends a session identifier (session ID) to the payment processing platform 125 to begin the trust establishment process. In one embodiment, the session ID is passed from the financial institution 140 to the payment processing platform 125 via the secure payment page 345. Next, at step 504, the payment processing platform 125 sends the session ID back to the financial institution 140 through a back door to verify that the financial institution 140 had indeed sent that session ID, rather than a hacker, for instance. It should be noted that the exchange of the session ID is not the only means of establishing trust between the systems 125, 140; rather, trust may be established by any means known in the art without departing from the principles of the present invention. Then, at step 506, the financial institution 140 sends a customer identifier (customer ID) to the payment processing platform 125. In one embodiment, within the servers of the payment processing platform 125, the customer ID may be used to translate from a child product card number to a "real" account number, as described in greater detail below.

Again, as described above, trust may be established via the method 500 between a third party other than a financial institution and the payment processing platform 125.

Figure 6:
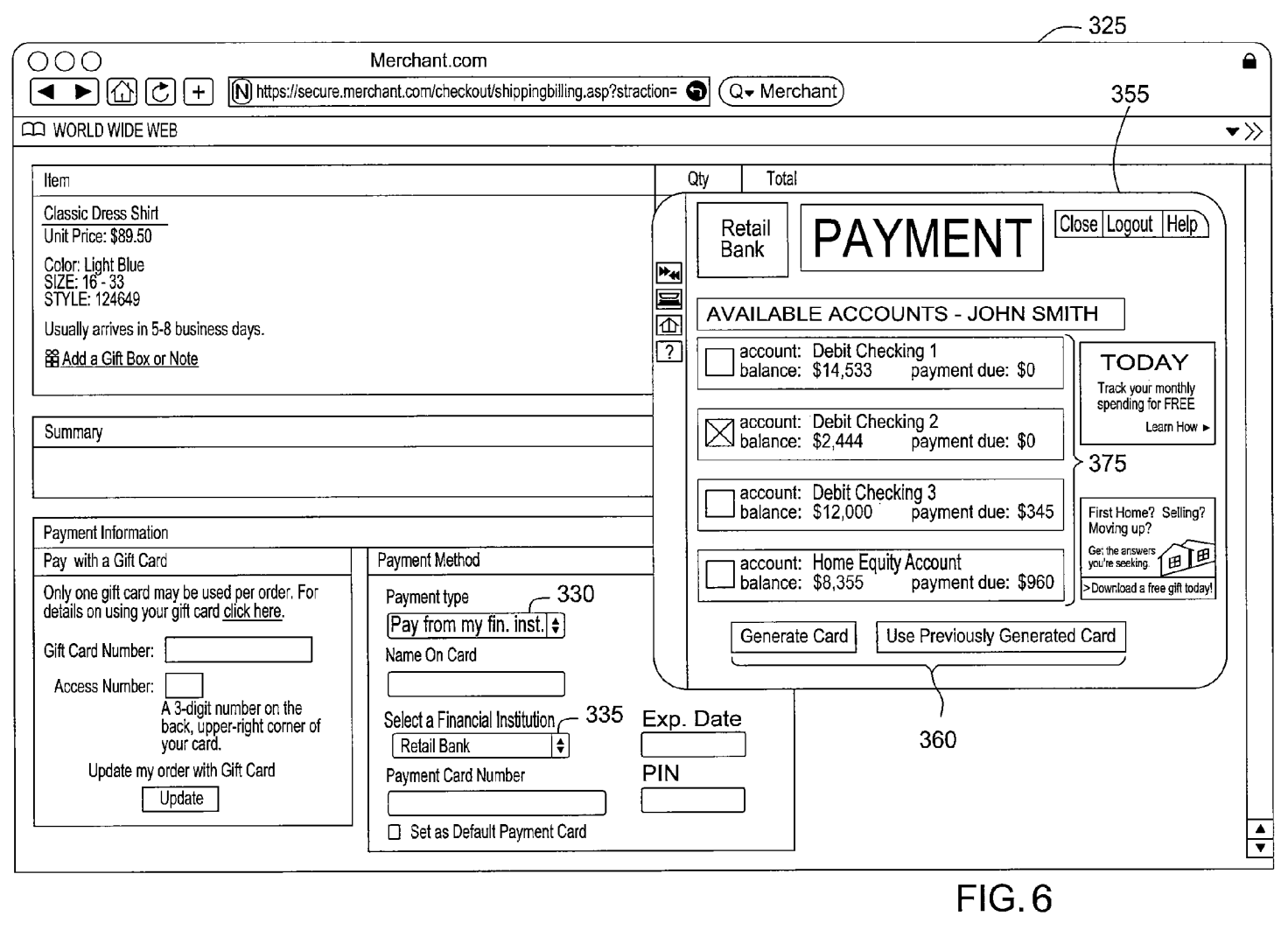

After step 506, the transaction proceeds to step 230 in FIG. 2. Referring back to FIG. 2, at step 230, the user selects an account from which to pay for the goods or services provided by the online merchant 145. As shown in FIG. 6, the payment processing platform 125 displays an account list 375 via a second payment page 355. In another embodiment, the financial institution 140 may display the account list 375 in a second payment page 355. The user may then select one or more accounts from the account list 375 with which to pay. In one embodiment, the accounts listed by the payment processing platform 125 may be called "core accounts," and may be any standard account held with a financial institution, including a checking account, a savings account, a home equity line of credit, a money market account, a healthcare savings account, an educational savings account, a rewards or loyalty program account, a billed account, or the like.

Referring back to FIG. 2, at step 235, a child product is generated by the payment processing platform 125. In one embodiment, the child product is generated having a 16-digit card number, a CVV value, an expiration date, and a name on card. As is known, a card number includes a Bank Identification Number or BIN number. The BIN number is generally a one-digit to six-digit number that identifies the financial institution that issued the debit card. In one embodiment, the child product generated at step 235 includes a BIN number that identifies that the child product was issued by the payment processing platform 125. In alternative embodiments, the generated child product may include a BIN number within a range that identifies that the child product is associated with a particular financial institution, but is nevertheless a child product. In some embodiments, the child product that is generated comprises a virtual card. In other embodiments, the child product that is generated comprises a physical card. In still further embodiments, the child product that is generated comprises a virtual card with a physical card manifestation.

A virtual card number and a virtual CVV associated with the child product may be generated and linked to the user's account held at the financial institution. Thus, the user is able to use the child product to initiate the online payment transaction as if the transaction was being made using a normal credit/debit card. As is described in greater detail in FIGS. 8 and 9, a core account transaction, including a "real" account number of the core account held with the financial institution 140, may then be generated by the payment processing platform 125 and sent to the financial institution 140 that issued the core account. The processing system at the financial institution 140 that issued the core account processes the core account transaction in normal fashion and approves or denies the transaction based on a normal set of processing rules.

Figure 7:
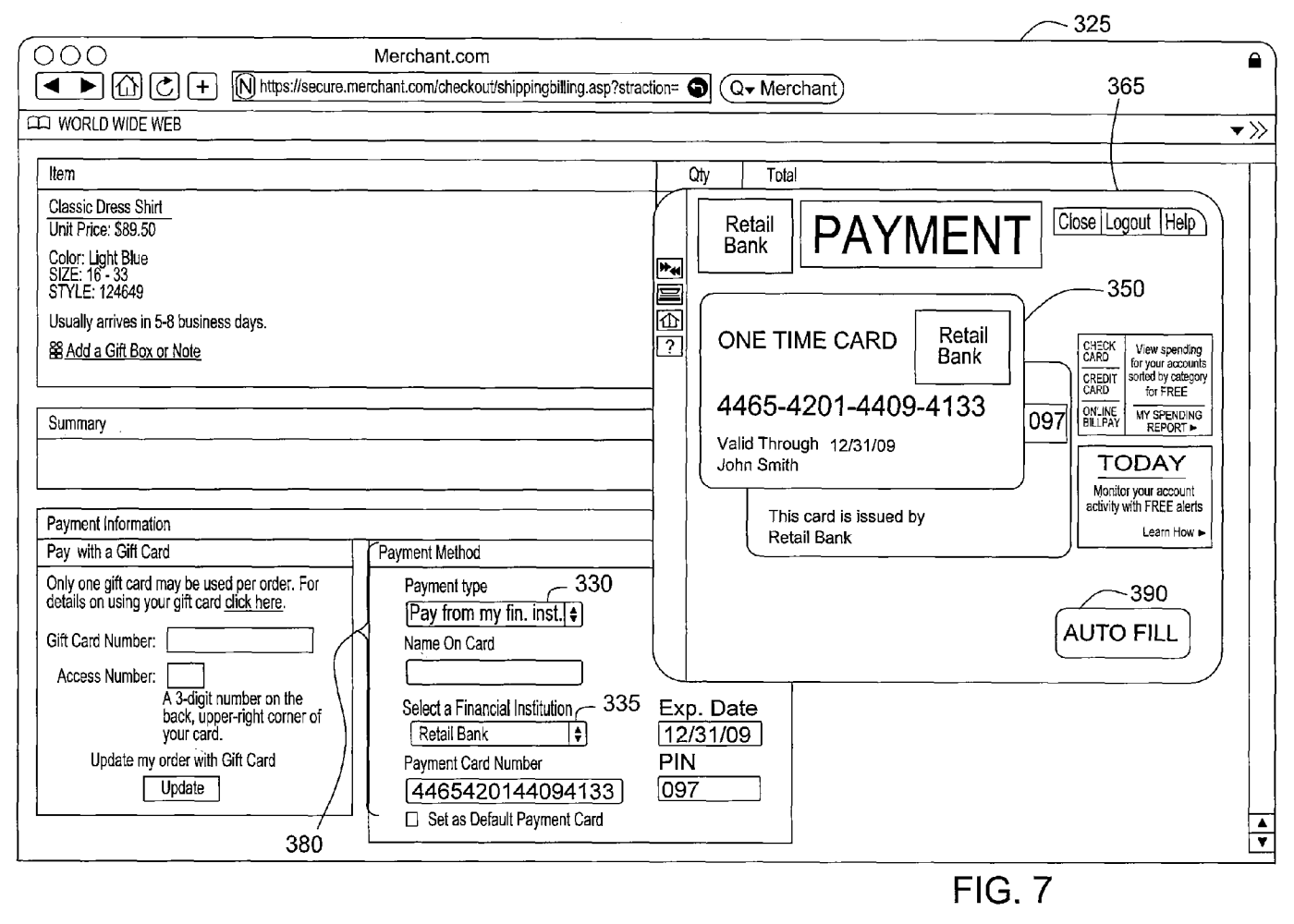

Referring now to FIG. 7, a secure pay window 365 displays the child product 350 generated by the payment processing platform 125, in one embodiment of the invention. As shown, the child product 350 is generated having a 16-digit card number, a CVV, an expiration date, and a name on card. In one embodiment of the invention, the child product generated at step 235 includes a BIN number that identifies that the child product 350 was issued by the payment processing platform 125. In another embodiment of the invention, the child product generated at step 235 includes a BIN number that identifies that the child product 350 was issued by the financial institution 140.

The child product 350 may be configured with specific control parameters. In one embodiment, control parameters include a series of restrictions on transactions made with child product. For example, the control parameters may include, but are not limited to, a card spending limit, a per transaction spending limit, a limit on number of transactions in a given period, an activation date, an expiration date, a country of use, a merchant name, a merchant category, a time of day, a day of week, a date of month, a merchant channel (internet, point-of-sale), a reset frequency for resetable cards, and the like. When the child product is attempted to be used in a payment transaction, the transaction details may be checked against the control parameters stored for the child product. For example, the child product may be a one time use child product that is deactivated after being used once in a payment transaction.

When a child product is attempted to be used in an online payment transaction, the transaction details may be checked against the control parameters stored for the child product. In one embodiment, if at least one of the control parameters is not satisfied, then the transaction is rejected. If each of the control parameters match those stored for the child product, the transaction is processed as described in greater detail below in FIGS. 8 and 9. In alternative embodiments, if a minimum number of control parameters are satisfied, then the transaction is approved. For example, a child product may include five control parameters and a transaction is approved if four out of five control parameters are satisfied. In still further embodiments, control parameters may be assigned "weights" such that a transaction is approved if the sum of the weights assigned to the satisfied control parameters exceeds a minimum value. For example, a per use limit control parameter may be assigned a weight of five, a merchant category control parameter may be assigned a weight of four, a merchant name parameter may be assigned a weight of three, and all other control parameters may be assigned a weight of two. In this example, a transaction may be approved if the sum of the satisfied control parameters exceeds ten. As will be understood by those having ordinary skill in the art, other techniques for comparing the transaction details against the control parameters stored for the child product to determine a match may be available.

In one embodiment, the control parameters from the generated child product may automatically include a merchant restriction. For example, the control parameter may limit the use of the generated child product to the specific merchant from which the user is attempting to make a purchase in the online merchant payment page 325. Similarly, a control parameter may be automatically created that limits the generated child product to use within a time interval, e.g., the next hour. For example, if a transaction is attempted with the generated card number outside of the one-hour time limit, then the transaction is denied. As one having ordinary skill in the art will appreciate, other automatically generated control parameters may be created for the generated child product.

As also shown in FIG. 7, in one embodiment, the child product details may be automatically filled into the payment fields 380 on the online merchant payment page 325. Enabling this "auto fill" option allows for the automatic transfer of the name, card number, expiration date, and CVV value of the generated child product to the payment fields 380 of the online merchant payment page 325. In one embodiment, a user may select an auto fill button 390 included in the secure payment page 365 to initiate the transfer of the child product information into the online merchant payment page 325.

In other embodiments, the auto fill option is configured to transfer information from one browser window to another browser window. In some embodiments, the information that is transferred is payment information that is transferred to a payment page in a browser window. As described, in some embodiments, the payment information that is transferred comprises details of a child product that is linked to a core account. In other embodiments, the payment information that is transferred comprises core account information or any other type of payment information, other than child product information, that is input into a payment page to make an online payment or purchase.

In alternative embodiments, the user may manually input the child product information into the payment page 325. In another embodiment, the user may drag-and-drop the payment information in the appropriate payment fields 380 on the payment page 325. The details of the functionality of the "auto fill" option are described in greater detail below in FIGS. 10 and 11.

Referring back to FIG. 2, at step 240, the payment transaction is processed. The details of step 240 are described in FIGS. 8 and 9.

Figure 8:
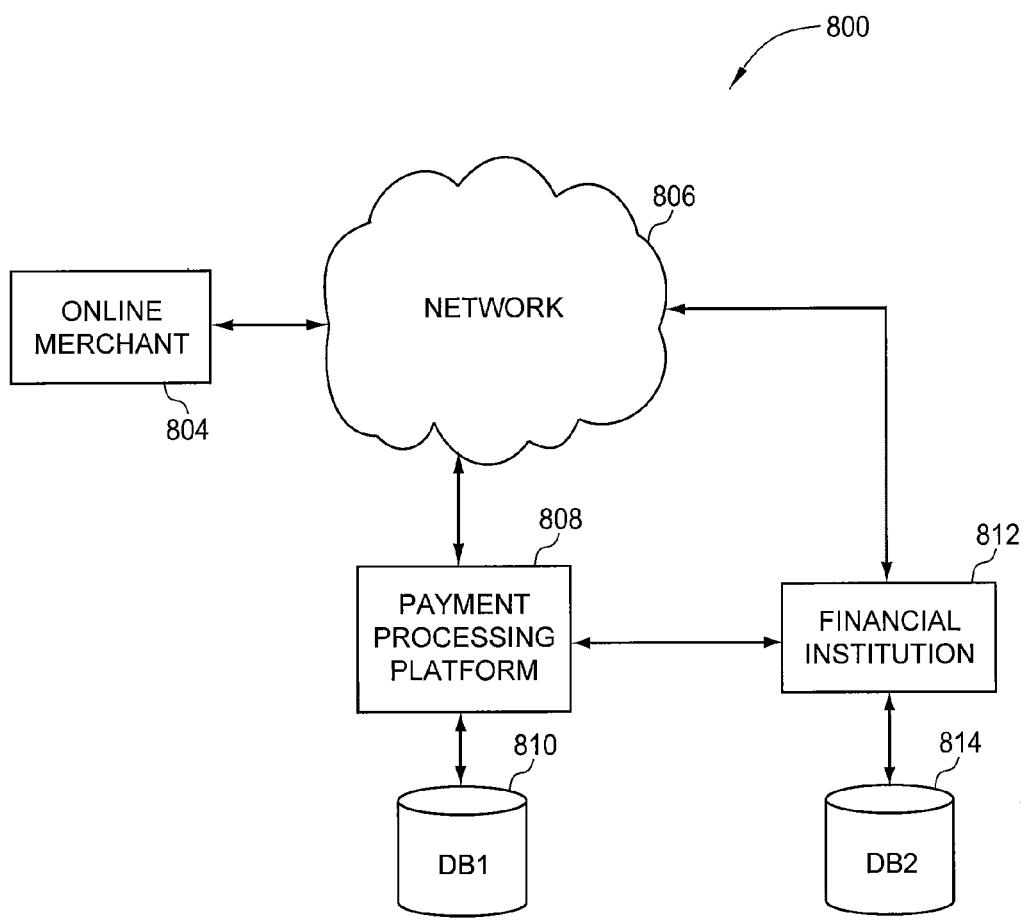
FIG. 8 is a block diagram illustrating components of a system configured to process a child transaction, according to embodiments of the invention.

FIG. 8 is a block diagram illustrating components of a system 800 configured to process a child transaction, according to embodiments of the invention. As shown, the system 800 includes an online merchant 804, a network 806, a payment processing platform 808, a first database 810, a financial institution 812, and a second database 814.

As described above, the child product may be delivered in the form of a virtual card through the user's web browser on the user device 105. Alternatively, a child product may be delivered virtually on a user's mobile device or via any other technically feasible mechanism.

In one embodiment, network 806 is an electronic funds transfer (EFT) network, a credit card network, a debit card network, a private network, or any other technically feasible type of network. Additionally, the child product may be a special card in which case the child transaction information is sent to the appropriate private network.

In one embodiment, when a child transaction is received by the network 806 and identified as having a BIN number range associated with the payment processing platform 808 that issued the child product, then the child transaction is routed to the payment processing platform 808. In another embodiment, when a child transaction is received by the network 806 and identified as having a special BIN number range associated with a financial institution of the core account, then the child transaction is routed to the payment processing platform 808.

When a child transaction is received by the payment processing platform 808, the payment processing platform 808 may then compare the child transaction details with control parameters stored for that particular child product in the first database 810. As described above, the comparison may require that each control parameter stored for the child product is satisfied, that a minimum number of control parameters are satisfied, or that a sum of the weights assigned to control parameters that are satisfied exceeds a minimum value. In one embodiment, if at least one of the control parameters is not satisfied, then the payment processing platform may return a decline response to the network 806 and the child transaction is denied. If each of the control parameters is satisfied, then the card number of the child product is linked to the "real" account number of the core account to which the child product is linked. In one embodiment, the second database 814 contains the mapping from child product card numbers to core account numbers, and may be located on the systems of the financial institution 812. In alternative embodiments, the second database 814 may reside on systems operated by the payment processing platform 808. Once the core account number is determined, a core account transaction is generated and is transmitted to the network 806 for normal routing and processing as a core account transaction. In one embodiment, the core account transaction includes the real PIN number and/or real core account number of the core account. The core account transaction is sent to the financial institution 812 that issued the core account. The processing system at the financial institution 812 that issued the core account processes the core account transaction in normal fashion and approves or denies the transaction based on a normal set of processing rules.

Figure 9:
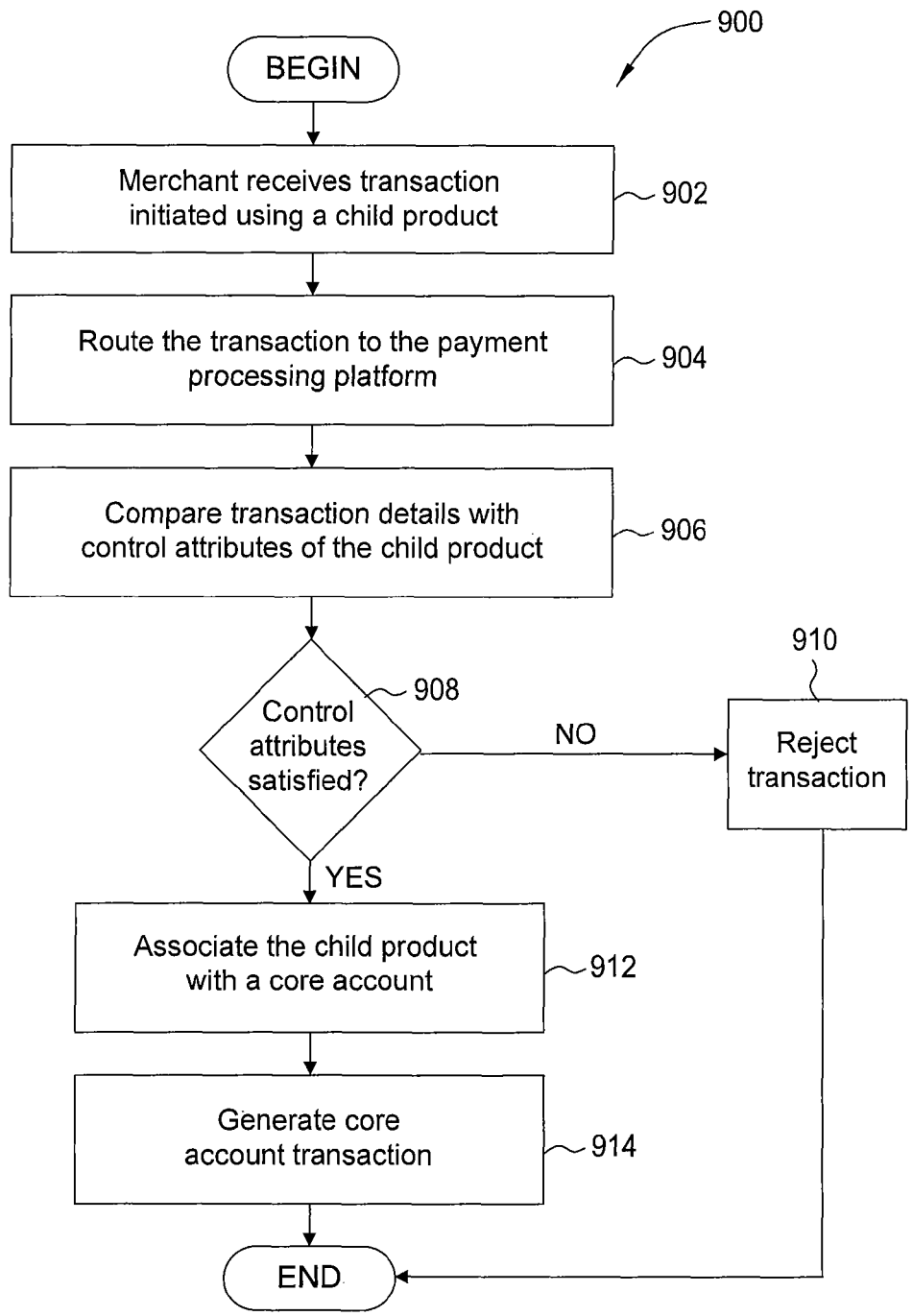
FIG. 9 is a flow diagram of method steps for processing a child transaction, according to one embodiment of the invention.

FIG. 9 is a flow diagram of method steps for processing a child transaction, according to one embodiment of the invention. Persons skilled in the art will understand that, even though the method 900 is described in conjunction with the systems of FIGS. 1 and 8, any system configured to perform the steps of the method 900 illustrated in FIG. 9, in any order, is within the scope of the present invention.

As shown, the method 900 begins at step 902, where a merchant receives a child transaction initiated using a child product. In one embodiment, the merchant is an online merchant and receives a child product card number that is input, either manually or automatically, into a payment webpage of the online merchant website.

At step 904, the child transaction is routed to the payment processing platform that generated the child product. As described above, a child product includes a BIN number range that identifies it as being a child product. In one embodiment, the child transaction is passed directly to the payment processing platform, bypassing the network. In alternative embodiments, the child transaction is passed to the payment processing platform through a network. In alternative embodiments, the child transaction is processed through multiple networks before ultimately being routed to the payment processing platform. In other embodiments, the child transaction is routed to the financial institution. The financial institution then routes the child transaction to the payment processing platform.

At step 906, the payment processing platform compares the child transaction details with control parameters of the child product. As described above, each child product is associated with a series of control parameters that are stored in a first database, referenced by child product. When the child transaction is received by the payment processing platform, the child product card number may be used as a reference pointer to determine the associated control parameters stored in the first database.

At step 908, if the control parameters of the child transaction do not match the control parameters stored in the first database, then the child transaction is rejected, a denial is returned at step 910, and the method 900 terminates. In one embodiment, if the child transaction was routed from the merchant to the payment processing platform bypassing the network, then the denial is returned directly to the merchant. In alternative embodiments, if the child transaction was routed through a network to the payment processing platform, then the denial is returned to the network and routed to the merchant. In still further embodiments, if the child transaction was routed from the merchant to the financial institution, which routes the child transaction to the payment processing platform, then the denial is returned directly to the financial institution.

As described above, the determination of whether the control parameters match at step 908 may require that each control parameter stored for the child product is satisfied, that a minimum number of control parameters are satisfied, or that a sum of the weights assigned to control parameters that are satisfied exceeds a minimum value. If at step 908 the control parameters match, then the method 900 proceeds to step 912.

At step 912, the child product is associated with a core account. As described above, a second database stores a mapping of the child product to the core account to which the child product is linked. In one embodiment, the second database resides on the financial institution system. In alternative embodiments, the second database resides within the payment processing platform system.

At step 914, a core account transaction is generated with the core account number and other child transaction details. In one embodiment, the core account transaction is transmitted to the network for normal processing. For example, the financial institution that receives the core account transaction may view the core account transaction having the payment processing platform as being the "merchant" from which the transaction was initiated.

In alternative embodiments, the core account transaction is transmitted directly to the financial institution from the payment processing platform, bypassing the network. In further alternative embodiments, when the core account transaction is received at the financial institution, the financial institution sees the core account transaction as initiating from the payment processing platform. Thus, the financial institution transfers funds to the payment processing platform, which in turn transfers the funds to the original merchant. In alternative embodiments, the financial institution that receives the core account transaction can determine the original merchant is the payee, and the funds are transferred to the merchant, bypassing the payment processing platform.

Auto Fill Option

As described in greater detail herein, embodiments of the invention provide one or more techniques whereby the information is automatically filled into the appropriate fields of the online webpage. In one embodiment, these features are enabled by the use of a browser add-on (also known as a browser extension or plug-in), in conjunction with a JavaScript program inserted into the online webpage.

Figure 10:
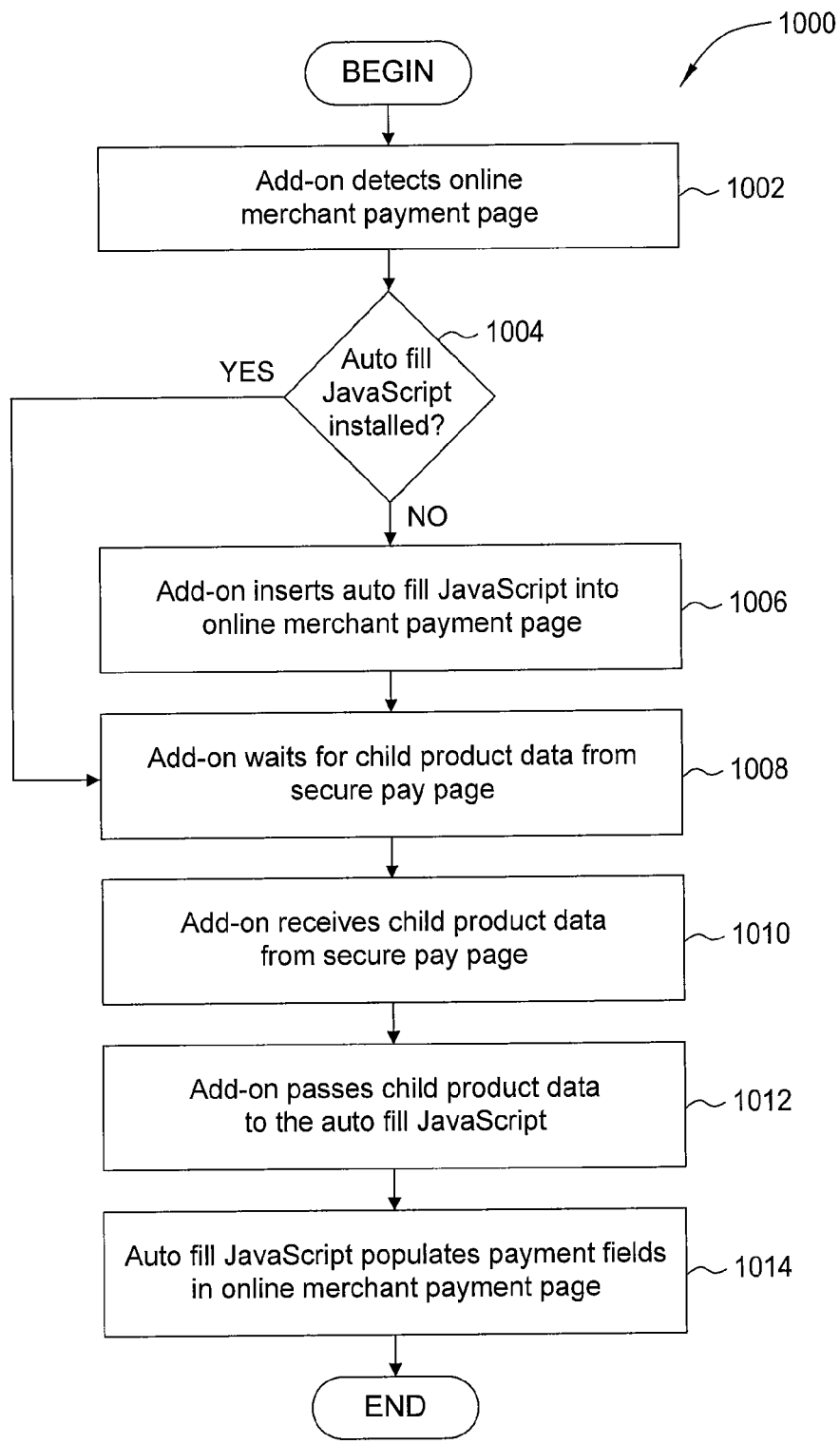
FIG. 10 is a flow diagram of method steps for automatically filling payment fields of the online merchant payment page when a browser add-on has been installed for the web browser, according to embodiments of the invention.

FIG. 10 is a flow diagram of method steps for automatically filling payment fields of the online merchant payment page 325 when a browser add-on has been installed for the web browser, according to embodiments of the invention. Persons skilled in the art will understand that, even though the method 1000 is described in conjunction with the systems of FIGS. 1 to 8, any system configured to perform the steps of the method 1000 illustrated in FIG. 10, in any order, is within the scope of the invention.

As shown, the method 1000 begins at step 1002, where the add-on, previously-installed for the web browser, detects an online merchant payment page 325. In one embodiment, the add-on automatically activates when the web browser is opened. The add-on is configured to check each webpage visited by the browser and to check the keywords and/or HTML of the webpage to determine whether the webpage is a payment page. For example, the add-on may determine that a webpage is a payment page by reading the source code of the webpage, such as the HTML code, for credit card information, e.g. card type, expiration date, CVV code, etc., or by reading a trigger, such as a header or an identification number embedded in the webpage.

At step 1004, the add-on determines whether an auto fill JavaScript is inserted in the online merchant payment page 325. If the auto fill JavaScript is not inserted, the method 1000 proceeds to step 1006, where the add-on inserts the auto fill JavaScript into the online merchant payment page 325. As is known, an add-on or browser extension has the capability of inserting JavaScript code into a web page. If, at step 1004, the add-on determines that the auto fill JavaScript is already inserted in the online merchant payment page 325, then the method 1000 proceeds to step 1008, where the add-on waits for child product data from the secure payment page 365, as described in conjunction with FIGS. 2-7. The secure payment page 365 may be opened in a separate browser window when the user selects a payment type involving child products. The user may then be guided through a series of screens to generate the child product. An example of a generated child product is the child product 350 shown in FIG. 7. When the user selects the auto fill button 390 in the secure payment page 365, the child product details associated with the child product, including a child product card number, a name on card, an expiration date, a PIN number, a CVV, or other such data, may be automatically transferred to the online merchant payment page 325 without the user selecting the auto fill button 390.

In the embodiment shown in FIG. 10, the add-on has been previously-installed in the browser. Thus, each browser window includes the add-on, including both the secure pay window 365 and the online merchant payment page 325. The add-on installed in the secure payment page 365 can transmit child product details to the add-on installed in the online merchant payment page 325. In one embodiment, the add-on included in each different browser window comprises a different instantiation of the same add-on. In alternative embodiments, each add-on included in each of the different browser windows comprises a different add-on. In yet another embodiment, each different browser window shares a single instantiation of the add-on.

At step 1010, the add-on installed in the online merchant payment page 325 receives the child product data from the secure payment page 365. At step 1012, the add-on installed in the online merchant payment page 325, passes the child product data to the auto fill JavaScript. The auto fill JavaScript, at step 1014, fills in the appropriate fields in the online merchant payment page 325 with the child produtt data received from the add-on installed in the online merchant payment page 325. Various heuristics may be used by the auto fill JavaScript to populate the fields of the online merchant payment page 325.

Alternatively, in another embodiment, if the add-on is not installed in the browser window, as described in FIG. 10, a different approach may be taken to automatically populating the fields of the online merchant payment page 325. For example, the add-on may not be installed in the browser window when a user is attempting to the auto-fill option in the first instance. This approach is described in (FIG. 11.

Figure 11:
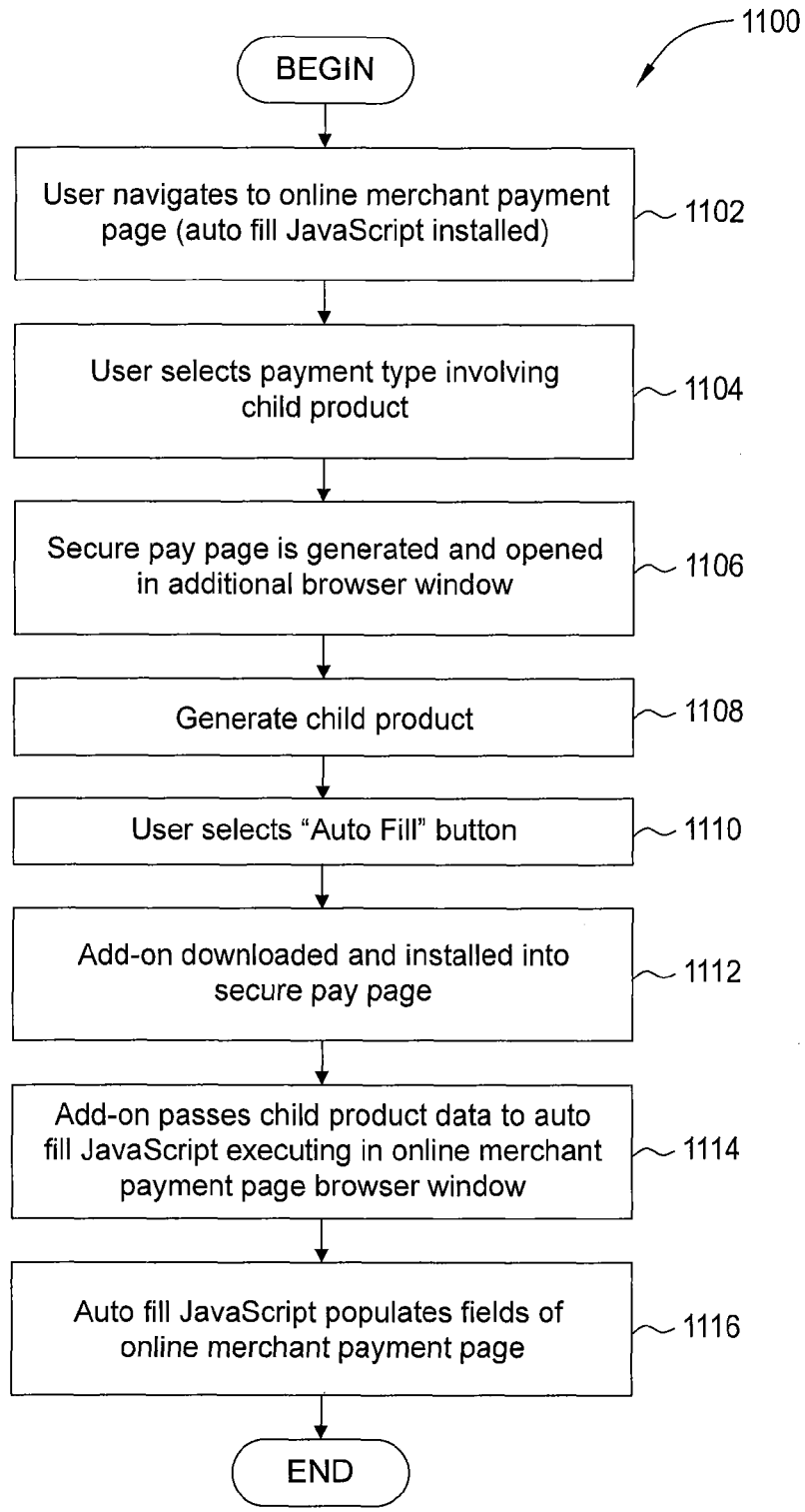
FIG. 11 is a flow diagram of method steps for automatically filling child product data into an online merchant payment

FIG. 11 is a flow diagram of method steps for automatically filling child product data into an online merchant payment page 325 when the add-on is not installed in the web browser, according to one embodiment of the invention. Persons skilled in the art will understand that even though the method 1100 is described in conjunction with the systems of FIGS. 1 and 8, any system configured to perform the steps of the method of 1100 illustrated in FIG. 11, in any order, is within the scope of the invention.

As shown, the method 1100 begins at step 1102, where the user navigates to an online merchant payment page 325. As described, the add-on described in FIG. 10 is not installed in the web browser. However, the auto fill JavaScript is inserted into the particular online payment page 325 to which the user has navigated.

In one embodiment, an online merchant may register with the payment processing platform and may configure their merchant website to accept payment via the payment processing platform. In such situations, the payment processing platform may provide the auto fill JavaScript to the online merchant, so that the online merchant may insert the auto fill JavaScript into the online merchant payment page 325. If the online merchant payment page 325 to which the user has navigated does not have the auto fill JavaScript inserted into the webpage (and the add-on is not installed for the browser), then the method 1100 terminates.

At step 1104, the user selects a payment type from the online merchant payment page 325 involving payment with a child product. At step 1106, a new browser window may automatically open, e.g., the secure pay window 345. At step 1108, the user may navigate one or more screens of the secure pay window 345 to generate a child product. For example, the child product may be the child product 350 shown in FIG. 7.

At step 1110, the user selects the auto fill button 390 in the secure payment page 365. At step 1112, the add-on is downloaded from a server and is installed in the secure payment page 365. As described herein, the add-on was not previously installed in the browser. Various techniques are known for installing a browser extension or add-on. In one embodiment, a web browser, such as Microsoft Internet Explorer or Mozilla Firefox, may allow for an add-on to be installed by providing an information bar that is displayed near the top of the browser window, just below the address bar. The user may then select an option in the information bar to accept or deny the installation of the add-on. If the user accepts the installation of the add-on, then the add-on is downloaded from a server and is installed.

One inherent limitation of installing browser add-ons is that when multiple browser windows are open simultaneously and an add-on is installed in one of the browser windows, the add-on is not installed in the other browser windows until the other browser windows are restarted. However, restarting the other browser windows may disrupt the workflow of the user. For example, if the user has spent a significant amount of time navigating to particular webpages, then the user may not want to restart the browser windows for fear of losing any previously gathered information. If the user does choose to restart the browser windows after installing the add-on, then payment processing and the auto fill functionality can be completed according to method 1000 described in FIG. 10.

The remaining steps in the method 1100, however, describes a technique for performing auto fill without restarting the browser after the add-on is installed in the secure payment page 365. Since the online merchant payment page 325 and the secure payment page 365 are separate browser windows, the add-on is only installed in the secure payment page 365. In one embodiment, the installed add-on can view the each of the other instances of the browser windows in a read capacity, but the add-on does not have write access to the other browser windows. This read/write distinction may exist since the two browser windows are in different domains. For this reason, the add-on installed in the secure payment page 365 cannot insert JavaScript code, such as the auto fill JavaScript described above, into the HTML of the other browser windows. It is for this reason that the method 1100 requires that the online merchant payment page 325 have the auto fill JavaScript already installed, as described in relation to step 1102.

Although the add-on installed in the secure payment page 365 cannot inject JavaScript into the online merchant payment page 325, the add-on can still push data to scripts already executing in open instances of the browser. The add-on can also call functions and pass parameters to those functions in the other browser windows. Accordingly, at step 1114, the add-on passes the child product data to the auto fill JavaScript executing in the online merchant payment page 325.

In one embodiment, when the secure payment page 365 is created at step 1106, the secure payment page 365 receives information related to the ID of the online merchant payment page from which the secure payment page 365 was created. In such an embodiment, the child product data passed to the auto fill JavaScript at step 1114 is passed only to the browser window having the same page ID as the page from which the secure payment page 365 was created. For example, if the user has several browser windows open, each of which is open to an online merchant payment page, the add-on installed in the secure payment page 365 passes the child product data to only the auto fill JavaScript executing in the online merchant payment page of the browser window from which the user selected to pay using a child product.

At step 1116, the auto fill JavaScript populates the fields of the online merchant payment page 325 with the child product data. Step 1116, in one embodiment, is substantially similar to step 1014 described above in FIG. 10.

FIGS. 10 and 11 describe automatically filling web page fields with payment information associated with a child product that is linked to a core account. However, in other embodiments, the auto fill option is configured to transfer any type of information from one browser window to another browser window. In some embodiments, the information that is transferred is payment information that is transferred to a payment page in a browser window. As described, in some embodiments, the payment information that is transferred comprises details of a child product that is linked to a core account. In other embodiments, the payment information that is transferred comprises core account information or any other type of payment information, other than child product information, that is input into a payment page to make an online payment or purchase. For example, the payment information may be transmitted from the financial institution and may be related to the core account. In another example, the payment information may be stored in a secure file on the user's computer.

In other embodiments, the browser may not support page IDs. In such embodiments, the secure payment page 365 may broadcast the child product data to all open browser windows. The online merchant payment page, with the installed JavaScript, from which the payment page 365 was created, may be expecting to receive this information. The other browser windows could simply ignore this information. In further embodiments, the add-on installed in the secure payment page 365 is configured to determine a URL (Uniform Resource Locator) of the online merchant payment page from which the secure payment page 365 was created. The secure payment page may then transmit the child product data to the browser window having the correct URL. In some embodiments, the add-on installed in the secure payment page 365 is configured to determine additional information, such as a session ID or other identifying information, along with or in place of the URL of the online merchant payment page from which the secure payment page 365 was created.

One advantage of the systems and methods disclosed herein is that a user that performs a payment transaction does not need to manually type in the payment product data into the online merchant payment page. Additionally, even if the browser add-on has not been previously installed in the computer system, alternative embodiments of the invention allow for the payment product data to be populated into the online merchant payment page without restarting the browser. Automatically populating the fields of the online merchant payment page allows users to save time and also minimizes data entry errors.

While the forgoing is directed to embodiments of the present invention, other and further embodiments of the invention may be devised without departing from the basic scope thereof. For example, aspects of the present invention may be implemented in hardware or software or in a combination of hardware and software. In addition, one embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed is:

1. A computer-implemented method for automatically populating fields of an online webpage, the method comprising:

displaying a first webpage on a display device in a web browser application executing on a computer system, wherein the first webpage has installed therein a code segment which is executed to populate fields in the first webpage;

generating, via a second webpage, a virtual card that is linked to a core account that provides financial backing for the virtual card, wherein the virtual card includes a card number and a card verification value ("CVV");

installing, in the second webpage, a browser add-on which pushes data including the card number and the CVV to the code segment; and executing the code segment to populate the fields based on the data.

2. The method of claim 1, wherein the first webpage comprises a merchant payment page, the fields included in the first webpage comprise payment fields, and the data comprises payment data.

3. The method of claim 2, wherein the core account is held with a financial institution.

4. The method of claim 2, wherein the payment data further includes a virtual personal identification number ("PIN"), a virtual expiration date, or a virtual name on card.

5. The method of claim 1, wherein the second webpage comprises a secure payment page.

6. The method of claim 1, wherein the code segment comprises a script.

7. The method of claim 1, further comprising installing a browser add-on in the first webpage.

8. The method of claim 1, further comprising the step of transmitting the data from the add-on installed in the second webpage to a browser add-on installed in the first webpage.

9. The method of claim 8, wherein transmitting the data is based on a user selection of an auto fill button.

10. The method of claim 8, wherein transmitting the data is performed automatically without a user making a selection of an auto fill button.

11. The method of claim 8, wherein the data is transmitted only to the first webpage and is not transmitted to other open instances of the web browser application.

12. The method of claim 8, wherein the data is transmitted to each open instance of the web browser application.

13. A computer-readable storage medium storing instructions that, when executed by a processor, cause a computer system to automatically populate fields of an online webpage, by performing steps comprising:
displaying a first webpage on a display device in a web browser application executing on a computer system, wherein the first webpage has installed therein a code segment which is executed to populate fields in the first webpage;
generating, via a second webpage, a virtual card that is linked to a core account that provides financial backing for the virtual card, wherein the virtual card includes a card number and a card verification value ("CVV");
installing, in the second webpage, a browser add-on which pushes data including the card number and the CVV to the code segment; and
executing the code segment to populate the fields based on the data.

14. The computer-readable storage medium of claim 13, wherein the first webpage comprises a merchant payment page, the fields included in the first webpage comprise payment fields, and the data comprises payment data.

15. The computer-readable storage medium of claim 14, wherein core account is held with a financial institution.

16. The computer-readable storage medium of claim 14, wherein the payment data further includes a virtual personal identification number ("PIN"), a virtual expiration date, or a virtual name on card.

17. The computer-readable storage medium of claim 13, wherein the second webpage comprises a secure payment page.

18. The computer-readable storage medium of claim 13, wherein the code segment comprises a script.

19. The computer-readable storage medium of claim 13, further comprising installing a browser add-on in the first webpage.

20. The computer-readable storage medium of claim 13, further comprising the step of transmitting the data from the add-on installed in the second webpage to a browser add-on installed in the first webpage.

21. The computer-readable storage medium of claim 20, wherein transmitting the data is based on a user selection of an auto fill button.

22. The computer-readable storage medium of claim 20, wherein transmitting the data is performed automatically without a user making a selection of an auto fill button.

23. The computer-readable storage medium of claim 20, wherein the data is transmitted only to the first webpage and is not transmitted to other open instances of the web browser application.

24. The computer-readable storage medium of claim 20, wherein the data is transmitted to each open instance of the web browser application.

25. A computing system for automatically populating fields of an online merchant payment webpage, the computing system comprising:
a user device including a processor, a display device for displaying an output from the processor, and a memory interconnected with the processor and storing instructions executed by the processor, the user device to:
display a first webpage on the display device in a web browser application executed by the processor, wherein the first webpage has installed therein a code segment which is executed to populate fields in the first webpage;
detect that the first webpage is an online payment page,
generate, via a second webpage, a virtual card that is linked to a core account that provides financial backing for the virtual card, wherein the virtual card includes a card number and a card verification value ("CVV");
install, in the second webpage, a browser add-on which pushes payment data including the card number and the CVV to the code segment, and
execute the code segment to populate the payment fields based on the payment data; and
a payment processing platform coupled to the user device via a network and generate or retrieve the virtual card.

26. The computing system of claim 25, wherein the payment data further includes a virtual expiration date or a virtual name on card.

* * * * *